Sept. 2, 1947.  E. TUNNICLIFF ET AL  2,426,904
COVERING OF ELECTRIC WIRES AND THE LIKE
Filed July 26, 1945  5 Sheets-Sheet 4

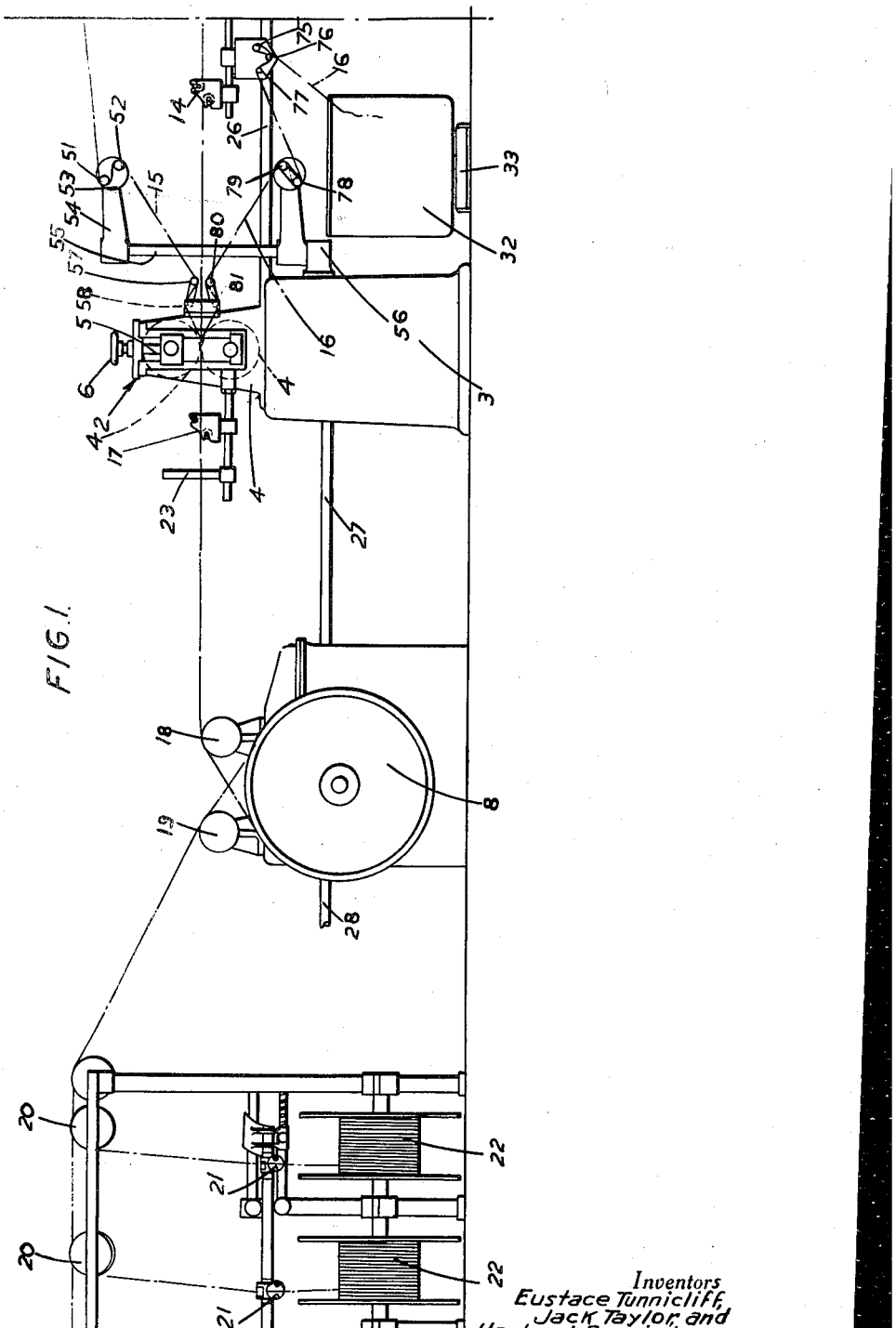

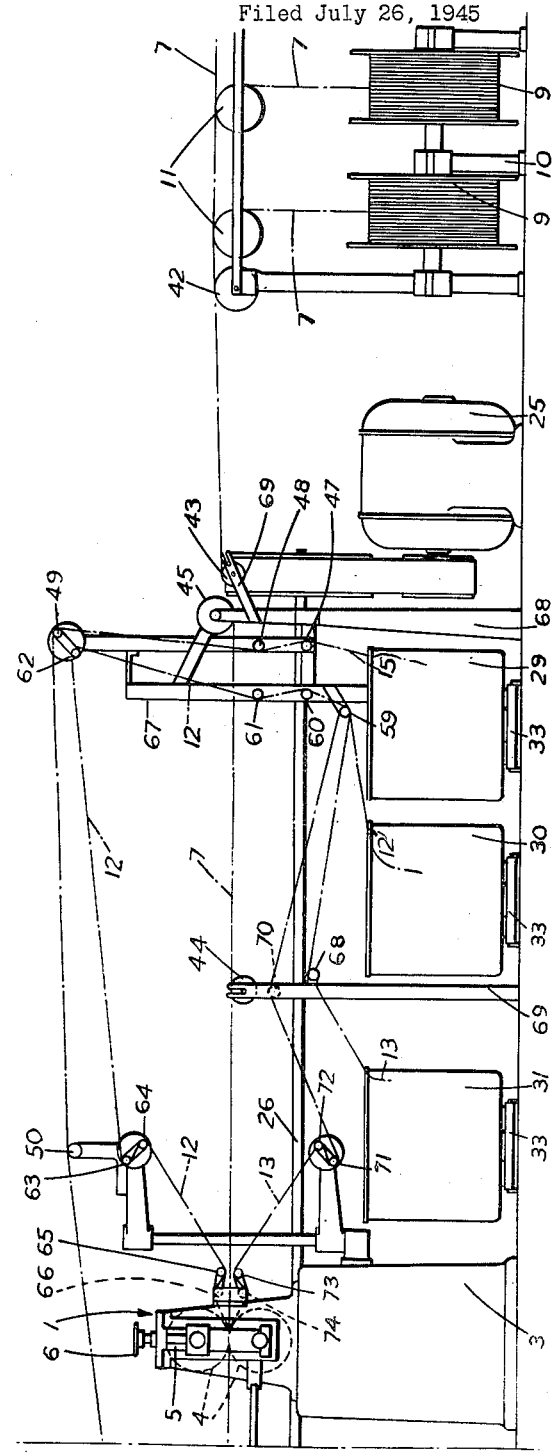

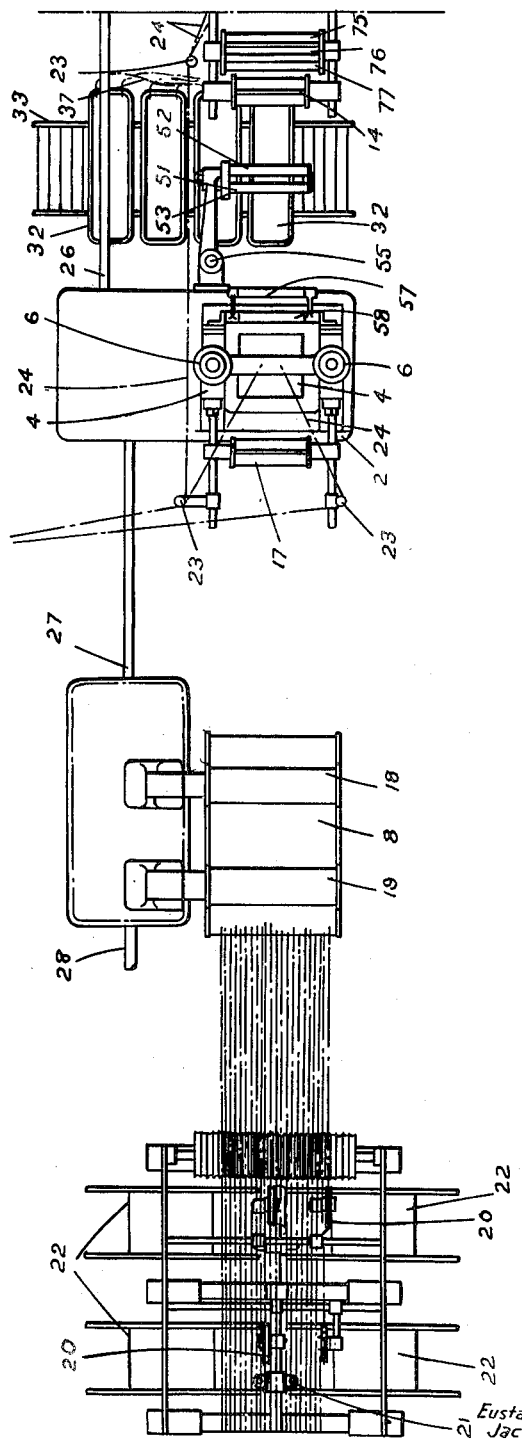

Inventors
Eustace Tunnicliff,
Jack Taylor, and
Herbert Dennis James
by
Stebbins, Blenko + Webb
Attorneys Sept. 2, 1947.  E. TUNNICLIFF ET AL  2,426,904
COVERING OF ELECTRIC WIRES AND THE LIKE
Filed July 26, 1945  5 Sheets-Sheet 5

Inventors
Eustace Tunnicliff,
Jack Taylor, and
Herbert Dennis James
by Stebbins, Blenko & Webb
Attorneys Patented Sept. 2, 1947

2,426,904

UNITED STATES PATENT OFFICE 2,426,904

COVERING OF ELECTRIC WIRES AND THE LIKE

Eustace Tunnicliff, London, and Jack Taylor and Herbert Dennis James, Leigh, England, assignors to British Insulated Callender's Cables Limited, London, England, a British company Application July 26, 1945, Serial No. 607,130 In Great Britain August 31, 1944

2 Claims. (Cl. 154—2.27)

1

This invention relates to the covering of electrical wires and the like by what is known as the longitudinal method, that is the method in which a number of wires, side by side with a strip of rubber or rubber-like material above and another strip below the wires are passed between a pair of grooved rolls which receive each wire in a pair of registering grooves and heavily compress the covering material in the regions between the grooves so as to seam it together at the edges of the groove and reduce the intervening material to such small thickness that the covered wires are readily separated from each other after leaving the rolls.

In such machines as at present operated the load factor is low; that is the ratio of the output of the machine over a period to the output which would be obtained if the machine were running continuously during that period may have the value of 25–30%. This is due to the large proportion of time during which the machine is standing for the purpose of replenishing the wires and the covering strips. The latter replenishing, especially in the case of certain covering materials, is of the more frequent occurrence and represents a large proportion of the inoperative time. An object of the present invention is to eliminate the stops for the replenishing of the strips and provide at the same time improved operation of the machine, in part due to the elimination of speed variations which are necessary at starting and stopping and in part to other conditions.

In longitudinal machines as at present operated, the strips of covering material are made up into rolls which are mounted on carriers and, as each roll becomes exhausted, it is necessary to stop the machine, remove the carrier, mount another carrier, join the old strip to the new and restart the machine. The present invention uses a different method of supply in which the new strip can be joined to the old and brought into feed in sequence with it without any stoppage or change of speed being necessary.

In the improved method no rolls of material are used for the supply of the strips. The strips are fed into the machine from containers in which they are folded in such a way so that both ends are brought out. One end passes over a frictional tensioning device and guiding members to the rolls and the other end is joined to the leading end of the strip of the next container so that transition from one container to the next can take place when the first is exhausted without any break in continuity of movement of the strip. This method of procedure permits containers to

2 be filled, moved into place, connected up, exhausted and removed without in any way interfering with the continuity of the working of the machine or producing any change in the conditions of operation at the rolls. This conduces not only to efficient utilisation of the machine, thereby obtaining increased output, but also avoids irregularities in the quality of production, particularly in the formation of places of imperfect joining in the covering, which may occur where stopping and restarting are necessary.

The containers are preferably in the form of boxes open at the top and of a width slightly greater than the width of the strip and of a length and depth substantially greater than the width. The strip of material is placed in the container in a series of folds, so that it passes backwards and forwards across the length of the container. The filling of the container is preferably done in such a way that from one of its ends the strip goes down inside one end wall of the container and then along the bottom and is then folded backwards and forwards on itself until the container is filled. The end which is last put in the container is the leading end for feeding into the machine, the other end is available for joining to the leading end coming from the container which is to follow the one in equestion in feeding the machine. These containers can be placed side by side at the feeding point and moved forward laterally into the feeding position when the strip is being drawn from them. The jointing can take place when the containers are standing side by side at the machine.

In order to provide for the smooth feed of the strips into the machine, each one is taken over a frictional tensioning device as it passes from the container to the rolls. Such a device may consist of a pair of smooth cylindrical rods placed near together and arranged so that the strip passes over one and under the other, maintaining a fairly large arc of contact on each, whereby the necessary tension is obtained due to the frictional sliding of the strip on the stationary surfaces. Other guides will also be provided so as to complete the control of the path from each container to the pair of rolls which it is to serve.

The invention will be described further with the aid of the accompanying drawings which illustrate a form of apparatus suitable for carrying out the method.

Figures 1 and 1A of the drawings together form a general view in side elevation of the apparatus with certain parts omitted.

Figures 2 and 2A together form a plan view of the apparatus but also with certain parts omitted.

Figure 2A:
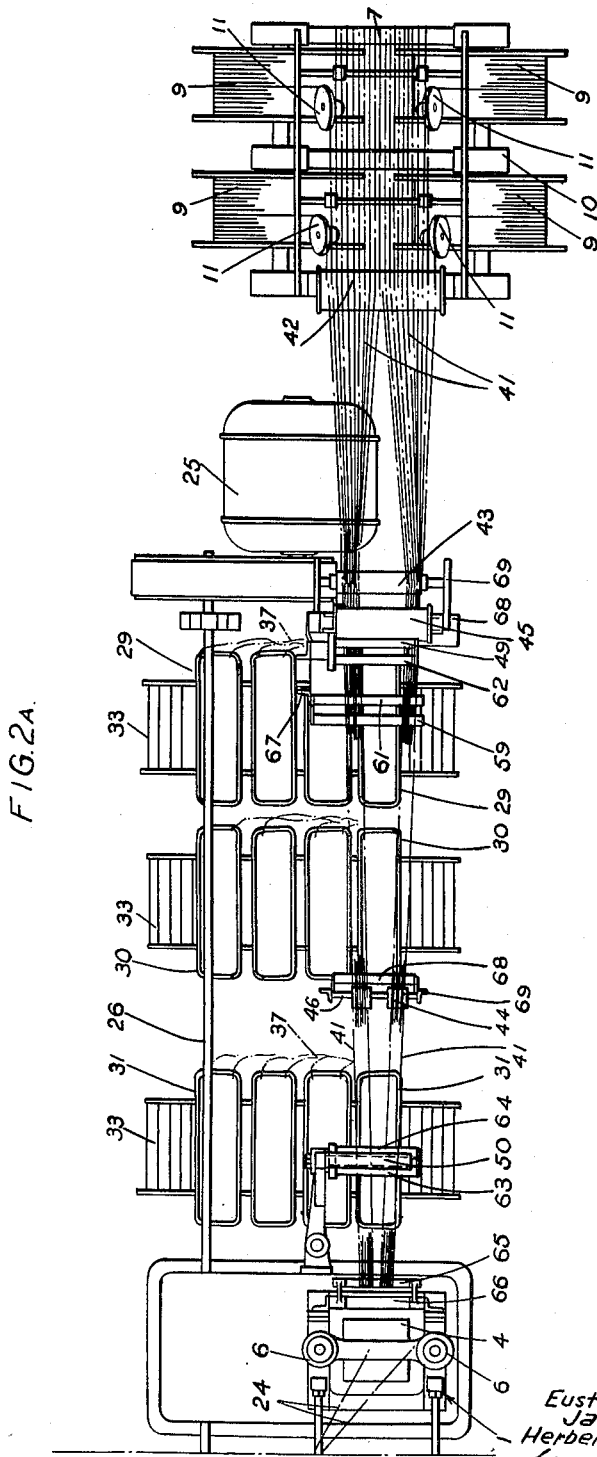

Referring first of all to Figures 1, 1A, 2 and 2A, the apparatus shown therein comprises a longitudinal covering machine having two heads indicated generally by the reference numerals 1 and 2 respectively, each head being mounted on a pedestal 3. The two heads are of the same and essentially of standard construction, each head having two grooved rolls 4 adapted to exert considerable pressure upon strips of material fed to the nip of the rolls, the pressure being adjustable by screws 5 provided with handles 6. Each roll 4 is provided with a number of circumferential grooves of semi-circular shape in cross-section and the grooves in one roll register with those in the other roll of the pair. The grooves are spaced by portions of the peripheries of the rolls and these portions are adapted to exert considerable pressure upon the covering material for the wires at each side of each wire, in the well-known manner, as the wires and covering material are supplied to the nip of the rolls.

The general operation of the apparatus shown is as follows: electric wires 7 to be covered are drawn through the apparatus by a driven take-up drum 8. The wires are drawn off reels 9 mounted in a paying out device indicated generally by the reference numeral 10 and are drawn forward to the grooved rolls of the heads 1 and 2 over guide pulleys 11. Only some of the reels and pulleys have been shown in the figures and it will, of course, be understood that a reel and a pulley will be required for each wire to be covered. Between the two heads 1 and 2 and for some distance on each side of each head, the wires 7 are constrained to follow a horizontal path, as will be seen from Figures 1 and 1A. The head 1 is supplied with strips 12 and 13 of appropriate insulating covering material, the strip 12 approaching the nip of the rolls 4 of that head from above the horizontally disposed row of wires 7 and the strip 13 approaching the nip of the rolls from below the row of wires. As the wires and the strips pass between the rolls of head 1, each wire is enclosed in a closely fitting envelope of the covering material and each envelope is joined to the adjacent envelopes by a very thin strip of covering material. From the head 1 the covered wires pass between guide rollers 14 to the grooved rolls 4 of head 2. Strips 15 and 16 disposed respectively above and below the wires 7 are fed to the head 2 to provide each wire with a second envelope fitting closely round the first. From head 2 the covered wires are passed between guide rollers 17 similar to the rollers 14 and the wires then pass over a guide pulley 18 round drum 8 and from the latter the wires are drawn over guide pulley 19 to guide pulleys 20. From the latter the wires pass through guides 21 to reels 22 upon which the covered wires are individually wound. The outer edges of the strips are not used and are treated as waste material and are led around guides 23 to any convenient form of collecting device. The paths of the waste material are indicated by the lines 24. The apparatus comprises a main shaft 26, driven by an electric motor 25, the take up drum 8 being driven from a shaft 27 and the reels 22, from a shaft 28.

The invention is concerned with the method of feeding the strip covering material to the grooved rolls of the longitudinal covering machine. It may here be stated that although a machine having two heads has been shown, the method of feeding is applicable to the case where only one head is employed as well as to the case where the machine has more than two heads.

As indicated above it has been the practice, hitherto, to wind the strips into rolls and to place the rolls in carriers and to feed the longitudinal covering machine by drawing the strips from the rolls. This method necessitates stopping the machine when the roll becomes exhausted and the replacement of the old carrier by a new one and the joining of the new strip to the old one, before the machine is ready to be started again. By the present invention the machine can be run continuously for long periods due to the improved method of feeding the machine with the strips of covering material.

Between the two pedestals 3 is disposed a laterally extending row of containers 32 and similarly between the pedestal for the head 1 and the motor 25 are disposed three laterally extending rows of containers indicated respectively by the reference numerals 29, 30 and 31. From Figures 2 and 2A it will be seen that the containers in the rows are placed side by side. Each container has the form of an open box and in plan is relatively long and narrow, is open at its upper end and has a depth substantially greater than its width. Each row of containers is placed upon a roller conveyor 33 to facilitate the movement of the containers from the filling into the feeding position. In Figures 2 and 2A the bottom container of each row is in the feeding position and the remaining containers are ready to be moved in turn into the feeding position as the container from which feeding is taking place becomes emptied of the strip covering material. In the particular arrangement illustrated in the figures, the strip 12 is being supplied from one of the containers 30 to the head 1, strip 13, from a container 31 to that head, strip 15, from a container 29 to the head 2 and strip 16, from one of the containers 32 to that head.

The strip covering material is placed in the various containers in such a manner that the two ends of each strip are readily accessible. The strips in those containers which are in the feeding position are fed forward from one end to the two heads and their trailing ends are joined to the forward or leading ends of the strips in those containers whose turn it is to be moved into the feeding position to replace the containers already in that position, when the latter have become empty. This joining of forward and trailing ends of adjacent strips is followed in respect of a convenient number of containers in each row so that there are always a number of full containers ready to be moved in turn into the feeding position immediately a container in that position becomes empty. All the containers in each row thus hold between them a long length of strip covering material ready to be fed forward as required to the two heads and as the containers in the feeding positions become empty, they can be readily moved off the conveyors and the original number of full containers be maintained by the replacement of an empty container by one that has been filled with the covering material. These filled containers will then form the last ones of the several rows and the forward or leading ends of the strips in those containers will be joined to the trailing ends of the strips in the adjacent containers. This method of feeding will thus permit a continuous supply of covering material to the longitudinal covering machine to be maintained. The attachment of the leading end of one strip to the trailing end of another strip may be readily effected by electric resistance heating and pressure.

Figure 3:
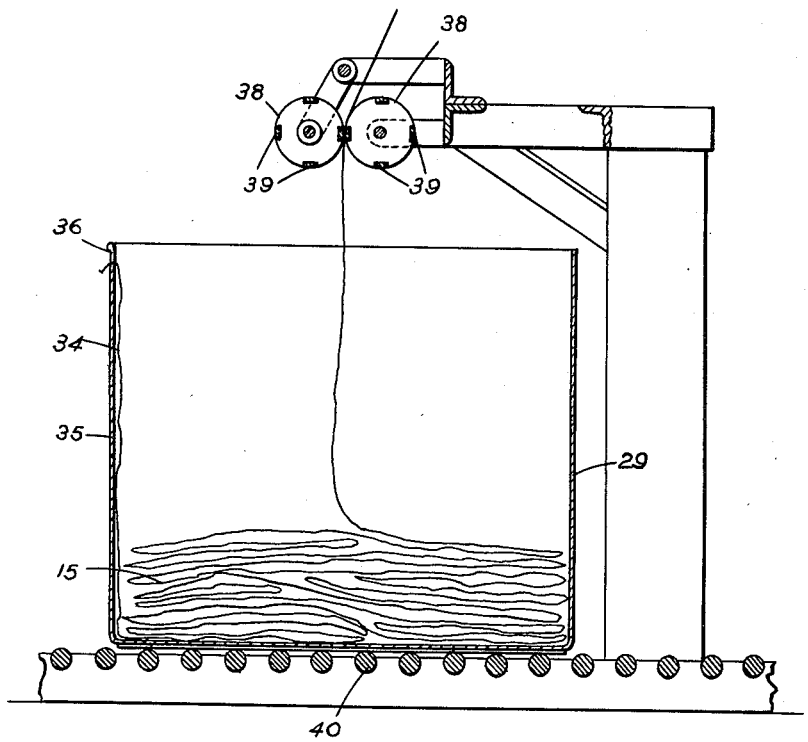
Figure 3 is a side elevation of a device drawn to a larger scale, for feeding the material into a container.

It is found that a satisfactory withdrawal of the strip material from the containers is obtained if the material is made to assume a zig zag formation in the containers when seen in cross-section so that the material forms a large number of more or less flat looped or folded portions joined together and piled up on top of each other. The feeding in of the material to a container need not be carried out with any great deal of accuracy or uniformity, however, as will be apparent from Figure 3 which indicates approximately how the material may be disposed in a container to enable its leading end to be attached to the trailing end of a strip in a second container and its trailing end to be attached to the leading end of a strip in a third container. The width of the container conveniently may approximate that of the strip material. In Figure 3 a container 29 is shown partly filled with the strip covering material 15, the trailing end 34 of which lies along the bottom of the container and extends upwards therefrom close to the adjacent end wall 35 and passes out at its upper end through an open slot 36 in the upper edge of that wall. The opposite end of the strip, when the container is full, will be the leading end of the strip. In Figures 2 and 2A the lines 37 are intended to indicate the connected ends of adjacent strips.

Figure 4:
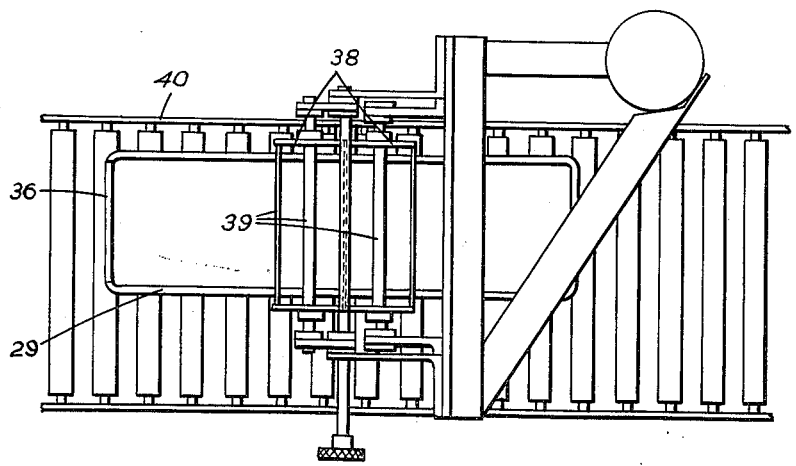
Figure 4 is a plan of Figure 3.

A convenient device for feeding the strips into the containers is shown in Figures 3 and 4. It consists essentially of two horizontally disposed cages 38 adapted to be rotated rapidly in opposite directions, the left-hand cage rotating in a clockwise direction and the right-hand cage in a counter-clockwise direction. The two cages are placed close together and each has a number of horizontally disposed rods 39 which engage the strip as it passes between them and feeds it into the container 29. The looping or folding of the strip is effected by moving the container backwards and forwards along a roller conveyor 40.

From Figures 1 and 1A it will be seen that all the containers for the strip covering material are placed at substantially floor level below the row of wires 7 to be covered. This arrangement of the containers has the advantage of facilitating their manipulation without excessive effort on the part of the operatives. Since the strips 12 and 15 approach their respective heads from above the row of wires 7, means are provided for permitting those strips to pass through the row of wires from below to a point above them. The means for effecting this will now be described with reference to Figure 2A. From that figure it will be seen that as the wires leave the paying out mechanism, shown at the right hand end of that figure, they are split up into two groups indicated by the reference numerals 41. These groups are spaced apart in the region above the containers 29 and 30 so as to provide a space through which the strips from those containers can be led upwards to points above the row of wires. The two groups of wires are maintained in spaced relationship by compelling each wire to follow a definite path. This is effected by drawing the wires through grooves in rotatable guide rollers 42, 43 and 44. The grooves in roller 42 are comparatively wide and the width of the roller is substantially equal to the maximum width of the row of wires. The roller 43 is made much smaller both in width and diameter and it has two widely spaced sets of grooves. The wires 7 pass over the roller 43 and are maintained in the grooves in that roller by a smooth surfaced roller 45 under which the wires pass to the rollers 44. The latter are mounted upon a spindle 46 and the two sets of grooves in those rollers are more closely spaced together than are the two sets of grooves in the roller 43. The wires 7 pass over the rollers 44 to the head 1 where they are covered by strips 12 and 13 and the covered wires then pass through the head 2 where the strips 15 and 16 are applied. The arrangement of the grooved rollers 42, 43 and 44 provides two spaced groups of wires which diverge as they travel from roller 42 to roller 43 where they are spaced the maximum distance apart and from roller 43 the two groups of wires converge as they travel to the head 1 where they are drawn through the grooves of the rolls 4 of that head in the usual manner.

The strips as they travel from the containers to the heads are provided with guides and tension controlling devices. The strip 15 is drawn out of container 29 round fixed guide pins 47, 48, 49 and 50 and from the latter, the strip passes over guide rods 51 and 52. The two rods 51 and 52 are placed close together and are parallel with each other and project horizontally from a disc 53 carried by a horizontal arm 54 fixed to the upper end of a vertical rod 55. The latter is supported in a bracket 56 fixed to the pedestal 3 of the head 2. The disc 53 is angularly adjustable and can be locked in its adjusted position. It is so adjusted that the strip makes a substantial area of contact with the rods 51 and 52 as it passes over them so that the necessary tension in the strip is obtained, as it is drawn forward out of the container, by the sliding friction of the strip on the smooth surfaces of the two rods 51 and 52. From the guide rod 52 the strip 15 passes under a guide roller 57 and over a guide roller 58 to the nip of the grooved rolls 4 of head 2.

The strip 12 is drawn out of container 30 and passes round guide pins 59, 60, 61 and 62. The strip then passes round rods 63 and 64 which form a tension controlling device for the strip in the same manner as the rods 51 and 52. Guide rollers 65 and 66 round which the strip passes to the nip of the grooved rolls 4 of head 1 are similar to rollers 57 and 58. The guide pins 59, 60, 61 and 62 and 47, 48 and 49 are mounted on a frame 67 and the roller 45 is mounted in a frame 68 having arms 69 which support the roller 43.

The strip 13 is drawn out of container 31 over guide pin 68 carried by a frame 69 and from thence it passes round guide pin 59 and from the latter, over guide pin 70 also mounted on frame 69. From guide pin 70 the strip is drawn round guide rods 71 and 72 which form a tension control device similarly to rods 51 and 52 and the strip then passes to the nip of the grooved rolls 4 of the head 1 over rollers 73 and 74.

The strip 16 is drawn out of container 32 round guide pins 75, 76 and 77 to guide rods 78 and 79 which function in the same way as guide rods 51 and 52. The strip is then drawn into the nip of the grooved rolls 4 of the head 2 around guide rollers 80 and 81.

The method is applicable to various insulating materials of which polyvinyl chloride compound and polythene are examples. The strips, however, should not have tacky surfaces.

The invention enables a considerably increased output from a longitudinal covering machine to be

What we claim as our invention is:

1. In the manufacture of covered electric wires by the strip process, in which process the wires to be covered placed side by side, with strips of the covering material placed above and below the wires respectively, are passed between a pair of grooved rolls which receive each wire in a pair of registering grooves and heavily compress the material in the regions between the grooves so as to seam the material at the edges of the groove, the art of maintaining a continuous feed of the covering material to the grooved rolls which comprises the steps of folding strips of the covering material to form two sets of confined piles of strip covering material, each pile consisting of superposed folds having both ends of the strip freely accessible, feeding under tension the leading end of a folded strip forming a confined pile of one set to the grooved rolls below the wires, feeding under tension the leading end of a folded strip forming a confined pile of the other set to the grooved rolls above the wires, and joining the trailing ends of said strips to the leading ends of strips in adjacent confined piles of their respective sets, the feeding of the two strips taking place first from one confined pile in each set and then continuing from an adjacent confined pile in the set.

2. In the manufacture of covered electric wires by the strip process, in which process the wires to be covered placed side by side, with strips of the covering material placed above and below the wires respectively, are passed between a pair of grooved rolls which receive each wire in a pair of registering grooves and heavily compress the material in the regions between the grooves so as to seam the material at the edges of the groove, the art of maintaining a continuous feed of the covering material to the grooved rolls which comprises the steps of folding strips of the covering material to form two sets of confined piles of strip covering material disposed below the wires to be covered, each pile consisting of superposed folds having both ends of the strip freely accessible, feeding under tension the leading end of a folded strip forming a confined pile of one set to the grooved rolls below the wires, guiding the wires to be covered to form spaced groups, passing the leading end of a folded strip forming a confined pile of the other set through the space between the groups of wires and feeding it under tension to the grooved rolls above the wires, and joining the trailing ends of said strips to the leading ends of strips in adjacent confined piles of their respective sets, the feeding of the two strips taking place first from one confined pile in each set and then continuing from an adjacent confined pile in the set.

EUSTACE TUNNICLIFF.
JACK TAYLOR.
HERBERT DENNIS JAMES.

REFERENCES CITED

The following references are of record in the file of this patent:

UNITED STATES PATENTS

| Number | Name | Date |
|---|---|---|
| 252,262 | Sawyer | Jan. 10, 1882 |
| 2,361,374 | Abbott | Oct. 31, 1944 |
| 1,915,843 | Wright | June 27, 1933 |